(12) United States Patent
Mayo et al.

(10) Patent No.: US 8,553,536 B2
(45) Date of Patent: Oct. 8, 2013

(54) MESH NETWORK MANAGEMENT SYSTEM

(75) Inventors: Thomas Clayton Mayo, Honeoye Falls, NY (US); Aaron Michael Wright, East Rochester, NY (US)

(73) Assignee: General Electric Company, Schenectady, NY (US)

( * ) Notice: Subject to any disclaimer, the term of this patent is extended or adjusted under 35 U.S.C. 154(b) by 173 days.

(21) Appl. No.: 13/180,816

(22) Filed: Jul. 12, 2011

(65) Prior Publication Data

US 2013/0016654 A1    Jan. 17, 2013

(51) Int. Cl.
*G08C 25/02* (2006.01)

(52) U.S. Cl.
USPC ............... 370/225; 370/312; 714/748

(58) Field of Classification Search
USPC ......... 370/310, 312, 216, 225, 228; 714/746, 714/748, 749
See application file for complete search history.

(56) References Cited

U.S. PATENT DOCUMENTS

| | | | |
|---|---|---|---|
| 5,335,278 A | 8/1994 | Matchett et al. | |
| 5,874,903 A | 2/1999 | Shuey et al. | |
| 6,304,191 B1 | 10/2001 | Campbell et al. | |
| 6,512,463 B1 | 1/2003 | Campbell et al. | |
| 6,754,188 B1 | 6/2004 | Garahi et al. | |
| 6,859,186 B2 | 2/2005 | Lizalek et al. | |
| 6,895,305 B2 | 5/2005 | Lathan et al. | |
| 7,123,918 B1 | 10/2006 | Goodman | |
| 7,126,494 B2 | 10/2006 | Ardalan et al. | |
| 7,145,474 B2 | 12/2006 | Shuey et al. | |
| 7,400,253 B2 | 7/2008 | Cohen | |
| 7,406,298 B2 | 7/2008 | Luglio et al. | |
| 7,420,952 B2 | 9/2008 | da Costa et al. | |
| 7,460,830 B2 | 12/2008 | Moore, III | |
| 7,626,931 B2 | 12/2009 | Wu et al. | |
| 7,630,736 B2 | 12/2009 | Wang | |
| 7,706,757 B2 | 4/2010 | Luglio et al. | |
| 7,792,488 B2 | 9/2010 | Karabinis et al. | |
| 7,814,322 B2 | 10/2010 | Gurevich et al. | |
| 7,853,417 B2 | 12/2010 | Vaswani et al. | |
| 7,885,243 B2 | 2/2011 | da Costa et al. | |
| 7,889,094 B2 | 2/2011 | Gilbert et al. | |
| 8,024,724 B2 * | 9/2011 | Garrison Stuber et al. | ... 717/172 |
| 2005/0111416 A1* | 5/2005 | Ginzburg | ...... 370/338 |
| 2008/0259844 A1 | 10/2008 | Richeson et al. | |
| 2010/0061272 A1* | 3/2010 | Veillette | ........ 370/329 |

\* cited by examiner

*Primary Examiner* — Kerri Rose

(74) *Attorney, Agent, or Firm* — Hoffman Warnick LLC; Ernest G. Cusick

(57) ABSTRACT

Aspects of the invention provide for a mesh network management system. In one embodiment, a system is disclosed having: at least one computing device adapted to manage a wireless mesh network by performing the actions comprising: sending data including a plurality of fragments over a network to a plurality of Advanced Metering Infrastructure (AMI) nodes, wherein the data is sent a predetermined number of times; receiving, from the plurality of AMI nodes, a message regarding the plurality of fragments of the data; and sending, in response to receiving the message, fragments of the data that were not received by the plurality of AMI nodes.

20 Claims, 2 Drawing Sheets

US 8,553,536 B2

MESH NETWORK MANAGEMENT SYSTEM

BACKGROUND OF THE INVENTION

The subject matter disclosed herein relates generally to mesh networks. More specifically, the present disclosure relates to a mesh network management system that allows for sending data over a radio network to a plurality of nodes within the mesh network.

In Advanced Metering Infrastructure (AMI) networks, a mesh network topology can be used in order for the nodes (i.e., the meters) to communicate within the network. However, it takes an excessively long time for an upgrade server to send large amounts of data to the many nodes within the AMI network. This is because the upgrade server uses a unicast routing scheme, where each AMI node is upgraded individually, by sending fragments of the upgrade data at a time. Each AMI node will respond with a success or failure for each fragment of the data, and the upgrade server will resend the upgrade data each time there is a failure. This is also extremely inefficient due to the large number of AMI nodes and the large number of data fragments.

BRIEF DESCRIPTION OF THE INVENTION

Aspects of the invention provide for a mesh network management system. In one embodiment, a system is disclosed having: at least one computing device adapted to manage a wireless mesh network by performing actions comprising: sending data including a plurality of fragments over a network to a plurality of Advanced Metering Infrastructure (AMI) nodes, wherein the data is sent a predetermined number of times; receiving, from the plurality of AMI nodes, a message regarding the plurality of fragments of the data; and sending, in response to receiving the message, fragments of the data that were not received by the plurality of AMI nodes.

A first aspect of the invention provides a system comprising: at least one computing device adapted to manage a wireless mesh network by performing actions comprising: sending data including a plurality of fragments over a network to a plurality of Advanced Metering Infrastructure (AMI) nodes, wherein the data is sent a predetermined number of times; receiving, from the plurality of AMI nodes, a message regarding the plurality of fragments of the data; and sending, in response to receiving the message, fragments of the data that were not received by the plurality of AMI nodes.

A second aspect of the invention provides a program product stored on a computer readable medium, which when executed by at least one computing device, performs the following: sends data including a plurality of fragments over a network to a plurality of Advanced Metering Infrastructure (AMI) nodes, wherein the data is sent a predetermined number of times; receives, from the plurality of AMI nodes, a message regarding the plurality of fragments of the data; and sends, in response to receiving the message, fragments of the data that were not received by the plurality of AMI nodes.

A third aspect of the invention provides a system comprising: at least one computing device adapted to manage a wireless mesh network by performing actions comprising: broadcasting data including a plurality of fragments over a network to a plurality of Advanced Metering Infrastructure (AMI) nodes, wherein the data is sent a predetermined number of times; receiving, from the plurality of AMI nodes, a message regarding the plurality of fragments of the data; and broadcasting, in response to receiving the message, fragments of the data that were not received by the plurality of AMI nodes.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Aspects of the invention provide for a mesh network management system. In one embodiment, a system is disclosed having: at least one computing device adapted to manage a wireless mesh network by performing actions comprising: sending data including a plurality of fragments over a network to a plurality of Advanced Metering Infrastructure (AMI) nodes, wherein the data is sent a predetermined number of times; receiving, from the plurality of AMI nodes, a message regarding the plurality of fragments of the data; and sending, in response to receiving the message, fragments of the data that were not received by the plurality of AMI nodes.

For example, as mentioned above, in Advanced Metering Infrastructure (AMI) networks, a mesh network topology can be used in order for the nodes (i.e., the meters, the routers, the servers, and the like) to communicate within the network. However, it takes an excessively long time for an upgrade server to send large amounts of data to all of the nodes within the AMI network. This is because the upgrade server uses a unicast routing scheme, where each AMI node is upgraded individually, by sending fragments of the upgrade data at a time. Each AMI node will respond with a success or failure for each fragment of the data, and the upgrade server will resend the upgrade data fragment each time there is a failure. It is only when an AMI node is fully upgraded, that the next AMI node will be upgraded. This is extremely inefficient due to the large number of AMI nodes and the large number of data fragments.

Figure 1:
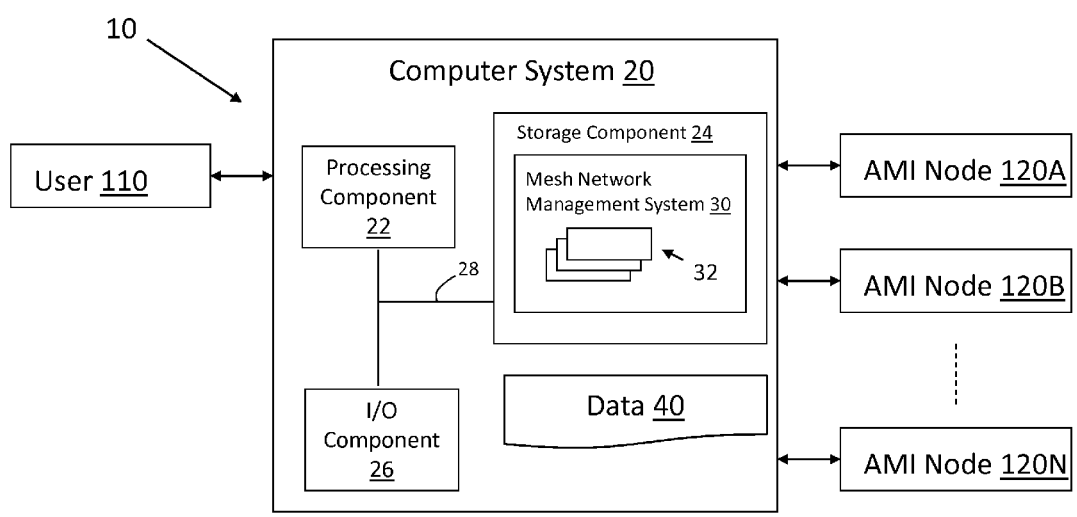
FIG. 1 shows an environment including a mesh network management system according to embodiments of the invention.

Turning to the drawings, FIG. 1 shows an illustrative environment 10 for managing a mesh network according to an embodiment of the invention. To this extent, environment 10 includes a computer system 20 that can perform a process described herein in order to manage a mesh network. In particular, computer system 20 is shown including a mesh network management system 30, which makes computer system 20 operable to manage a mesh network by performing a process described herein.

Computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, processing component 22 executes program code, such as mesh network management system 30, which is at least partially fixed in storage component 24. While executing program code, processing component 22 can process data, which can result in reading and/or writing transformed data from/to storage component 24 and/or I/O component 26 for further processing. Pathway 28 provides a communications link between each of the components in computer system 20. I/O component 26 can comprise one or more human I/O devices, which enable a human user 110 to interact with computer system 20 and/or one or more communications devices to enable a system user 110 to communicate with computer system 20 using any type of communications link. To this extent, mesh network management system 30 can manage a set of interfaces (e.g., graphical user interface(s), application program interface, and/or the like) that enable human and/or system users 110 to interact with mesh network management system 30. Further, mesh network management system 30 can manage (e.g., store, retrieve, create, manipulate, organize, present, etc.) the data, such as data 40, using any solution. Data 40, as will be described herein, may include, but is not limited to, a firmware update, a configuration file, or a data file.

In any event, computer system 20 can comprise one or more general purpose computing articles of manufacture (e.g., computing devices) capable of executing program code, such as mesh network management system 30, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, Mesh network management system 30 can be embodied as any combination of system software and/or application software.

Further, mesh network management system 30 can be implemented using a set of modules 32. In this case, a module 32 can enable computer system 20 to perform a set of tasks used by mesh network management system 30, and can be separately developed and/or implemented apart from other portions of mesh network management system 30. As used herein, the term "component" means any configuration of hardware, with or without software, which implements the functionality described in conjunction therewith using any solution, while the term "module" means program code that enables a computer system 20 to implement the actions described in conjunction therewith using any solution. When fixed in a storage component 24 of a computer system 20 that includes a processing component 22, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 20.

When computer system 20 comprises multiple computing devices, each computing device can have only a portion of mesh network management system 30 fixed thereon (e.g., one or more modules 32). However, it is understood that computer system 20 and mesh network management system 30 are only representative of various possible equivalent computer systems that may perform a process described herein. To this extent, in other embodiments, the functionality provided by computer system 20 and mesh network management system 30 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 20 includes multiple computing devices, the computing devices can communicate over any type of communications link. Further, while performing a process described above, computer system 20 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, the mesh network management system 30 enables computer system 20 to manage a mesh network and the technical effect is to enable data, such as a firm upgrade, or the like to be send to a plurality of nodes within a mesh network (such as mesh network 200). To this extent, mesh network management system 30 may manage the exemplary mesh network 200 in FIG. 2. However, it is understood that the mesh network 200 shown in FIG. 2 is only for explanation purposes, and that the mesh network management system 30 may manage any configuration of a mesh network.

Figure 2:
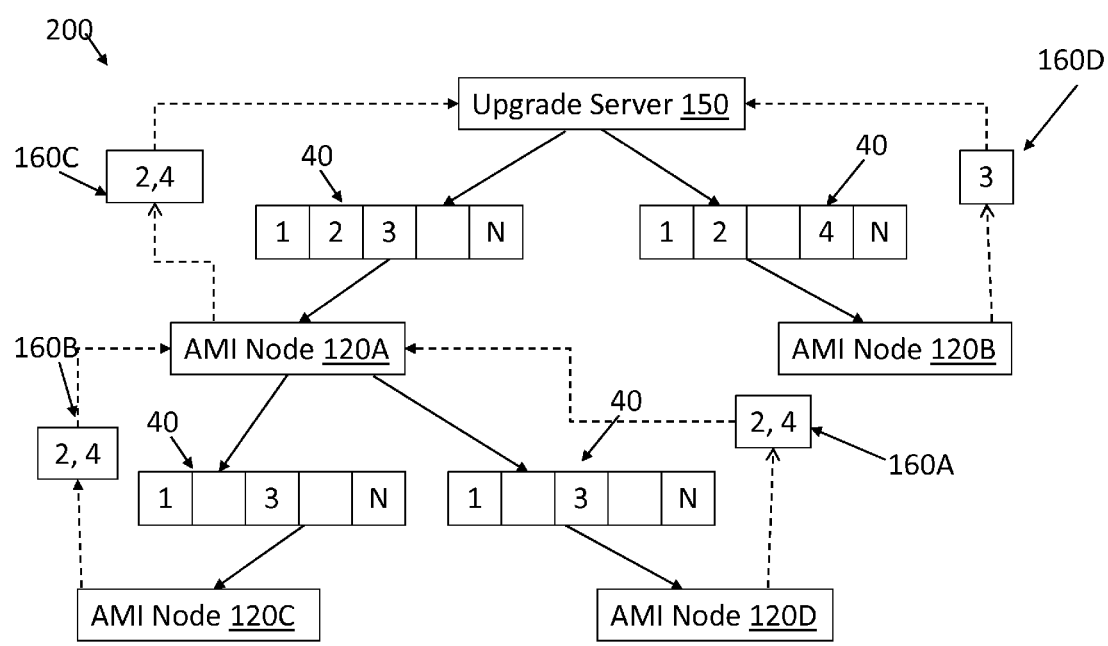
FIG. 2 shows an example of a mesh network according to embodiments of the invention.

Turning now to FIG. 2, the mesh network management system 30 (FIG. 1), will now be described with respect to the exemplary mesh network 200. The mesh network 200 includes a plurality of AMI nodes 120A, 120B, 120C, 120D. Although only four AMI nodes are shown in mesh network 200, it is understood that mesh network 200 may include any number of AMI nodes. Each AMI node 120A, 120B, 120C, 120D may be, for example, a meter or a repeater at a pole top.

The mesh network 200 also includes an upgrade server 150. Although not shown, the upgrade server 150 includes the mesh network management system 30 of the computer system 20, as shown in FIG. 1. It is understood that upgrade server 150 and the plurality of AMI nodes 120A, 120B, 120C, 120D communicate over a network (not shown) (e.g., a radio network).

To this extent, referring now to FIGS. 1 and 2, the upgrade server 150, using the mesh network management system 30, sends data 40, for example, a firmware update, as a plurality of fragments (shown as blocks 1, 2, 3, 4, N) over the network to the plurality of AMI nodes 120A, 120B. The data 40 may include any number (N) of fragments. The upgrade server 150, using the mesh network management system 30, may utilize a broadcast routing scheme that sends the data 40 to all recipients simultaneously. Alternatively, the upgrade server 150, using the mesh network management system 30, may utilize a multicast routing scheme that sends the data 40 to a group of recipients. The group of recipients in the multicast routing scheme may be indicated in a header (not shown) that is sent prior to the data 40. As can be seen in FIG. 2, the upgrade server 150 sends the data 40 to AMI node 120A and AMI node 120B. According to mesh network topology, AMI node 120A sends the data 40 to children AMI nodes 120C, 120D.

The upgrade server 150 sends the data 40 to the plurality of AMI nodes a predetermined number of times. For example, using the broadcast routing scheme, the upgrade server 150 may broadcast the data 40 to the plurality of AMI nodes 120A, 120B at least two times, so that AMI nodes 120A, 120B have two chances to receive the data 40. The predetermined number of times that the upgrade server 150 sends the data 40 to the plurality of AMI nodes 120A, 120B may be set by user 110.

As seen in FIG. 2, the AMI nodes 120A, 120B, 120C, 120D may not receive all of the fragments of the data 40. For example, the AMI node 120A did not receive fragment 4 of data 40. The AMI node 120B did not receive fragment 3 of data 40. Since the AMI nodes 120C, 120D received the data 40 from the AMI node 120A, the AMI nodes 120C, 120D also did not receive fragment 4 of data 40. Further, in this example, the AMI nodes 120C, 120D did not receive fragment 2.

After sending the data 40 the predetermined number of times, the upgrade server 150 receives a message 160 from each of the plurality of AMI nodes 120A, 120B that are directly connected, over the network, to the upgrade server 150. The message 160 may either include a list of the fragments of the data 40 that were not received by the plurality of AMI nodes 120A, 120B, 120C, 120D, or a list of fragments of the data 40 that were successfully received by the plurality of AMI nodes 120A, 120B, 120C, 120D. For example, in FIG. 2, a first message 160A is shown including the fragments 2, 4 of the data 40 that were not received by the AMI node 120D and a second message 160B is shown including the fragments 2, 4 of the data 40 that were not received by the AMI node 120C. The first message 160A and second message 160B are sent to the parent AMI node 120A. A third message 160C is sent to the upgrade server 150 from the AMI node 120A and is shown including the fragments 2, 4 of the data 40, which are the fragments that were not received by AMI nodes 120A, 120C, and 120D. Therefore, the message 160C sent from the AMI node 120A indicates that fragments 2 and 4 should be sent again. Additionally, the fourth message 160D sent from the AMI node 120B to the upgrade server 150 indicates that fragment 3 should be sent again.

The message 160 sent from each AMI node 120A, 120B to the upgrade server 150 or from each AMI node 120C, 120D to a parent AMI node 110A may be sent via a unicast routing scheme, wherein a specific node is configured to receive the message 160. Alternatively, the message 160 may be sent via a broadcasting routing scheme, as long as the message 160 is forwarded upstream, towards the upgrade server 150.

In order for each AMI node 120A, 120B, 120C, 120D to determine which fragments of the data 40 were not successfully received, the upgrade server 150 may send a header (not shown) prior to sending the data 40 that includes a list of the expected fragments of the data 40.

In any event, computer system 20 can obtain and/or manage data 40 using any solution. For example, computer system 20 can generate and/or be used to generate data 40, retrieve data 40 from one or more data stores, receive data 40 from another system, and/or the like. Data 40 may include, but is not limited to, a firmware upgrade, a configuration file, or a data file.

While shown and described herein as systems for managing a mesh network 200 (FIG. 2), it is understood that aspects of the invention further provide various alternative embodiments. For example, in one embodiment, the invention provides a computer program fixed in at least one computer-readable medium, which when executed, enables a computer system to manage a mesh network 200 (FIG. 2). To this extent, the computer-readable medium includes program code, such as mesh network management system 30 (FIG. 1), which implements some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as mesh network management system 30 (FIG. 1), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for managing a mesh network 200 (FIG. 2). In this case, a computer system, such as computer system 20 (FIG. 1), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

It is understood that aspects of the invention can be implemented as part of a business method that performs a process described herein on a subscription, advertising, and/or fee basis. That is, a service provider could offer to manage a mesh network 200 (FIG. 2) as described herein. In this case, the service provider can manage (e.g., create, maintain, support, etc.) a computer system, such as computer system 20 (FIG. 1), that performs a process described herein for one or more customers. In return, the service provider can receive payment from the customer(s) under a subscription and/or fee agreement, receive payment from the sale of advertising to one or more third parties, and/or the like.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
at least one computing device adapted to manage a wireless mesh network by performing the actions comprising:
sending data including a plurality of fragments over a network to a plurality of mesh network nodes, wherein the data is sent a predetermined number of times and wherein the predetermined number is at least two;
receiving, from the plurality of mesh network nodes, a message regarding the plurality of fragments of the data after the data including the plurality of fragments is sent the predetermined number of times; and
sending, in response to receiving the message, fragments of the data that were not received by the plurality of mesh network nodes.

2. The system of claim 1, wherein the sending of the data including the plurality of fragments over the network to the plurality of mesh network nodes includes one of broadcasting the data to all of the plurality of mesh network nodes or multicasting the data to a subgroup of the plurality of mesh network nodes.

3. The system of claim 1, wherein the plurality of mesh network nodes include Advanced Metering Infrastructure (AMI) nodes.

4. The system of claim 2, wherein the multicasting of the data to the subgroup of the plurality of mesh network nodes includes initially broadcasting a header that indicates the subgroup of the plurality of mesh network nodes.

5. The system of claim 1, wherein sending the data further includes initially sending to the plurality of mesh network nodes a header that has a list of expected fragments.

6. The system of claim 1, wherein the data includes one of: a firmware update, a configuration file, or a data file.

7. The system of claim 1, wherein the message includes a list of fragments of the data that were not received by the plurality of mesh network nodes.

8. The system of claim 1, wherein the message includes a list of fragments of the data that were successfully received by the plurality of mesh network nodes.

9. A program product stored on a non-transitory computer readable medium, which when executed by at least one computing device, performs the following:
sends data including a plurality of fragments over a network to a plurality of mesh network nodes, wherein the data is sent a predetermined number of times and wherein the predetermined number is at least two;
receives, from the plurality of mesh network nodes, a message regarding the plurality of fragments of the data after the data including the plurality of fragments is sent the predetermined number of times; and
sends, in response to receiving the message, fragments of the data that were not received by the plurality of mesh network nodes.

10. The program product of claim 9, wherein the sending of the data including the plurality of fragments over the network to the plurality of mesh network nodes includes one of broadcasting the data to all of the plurality of mesh network nodes or multicasting the data to a subgroup of the plurality of mesh network nodes.

11. The program product of claim 9, wherein the plurality of mesh network nodes include Advanced Metering Infrastructure (AMI) nodes.

12. The program product of claim 10, wherein the multicasting of the data to the subgroup of the plurality of mesh network nodes includes initially broadcasting a header that indicates the subgroup of the plurality of mesh network nodes.

13. The program product of claim 9, wherein sending the data further includes initially sending to the plurality of mesh network nodes a header that has a list of expected fragments.

14. The program product of claim 9, wherein the data includes one of: a firmware update, a configuration file, or a data file.

15. The program product of claim 9, wherein the message includes a list of fragments of the data that were not received by the plurality of mesh network nodes.

16. The program product of claim 9, wherein the message includes a list of fragments of the data that were successfully received by the plurality of mesh network nodes.

17. A system comprising:
at least one computing device adapted to manage a wireless mesh network by performing the actions comprising:
broadcasting data including a plurality of fragments over a network to a plurality of mesh network nodes, wherein the data is sent a predetermined number of times and wherein the predetermined number is at least two;
receiving, from the plurality of mesh network nodes, a message regarding the plurality of fragments of the data after the data including the plurality of fragments is sent the predetermined number of times; and
broadcasting, in response to receiving the message, fragments of the data that were not received by the plurality of mesh network nodes.

18. The system of claim 17, wherein broadcasting the data further includes initially sending to the plurality of mesh network nodes a header that has a list of expected fragments.

19. The system of claim 17, wherein the data includes one of: a firmware update, a configuration file, or a data file.

20. The system of claim 17, wherein the plurality of mesh network nodes include Advanced Metering Infrastructure (AMI) nodes.

* * * * *